United States Patent [19]

O'Holleran

[11] Patent Number: 4,769,348

[45] Date of Patent: Sep. 6, 1988

[54] FABRICATION OF REFRACTORY INSULATING MATERIALS CONSISTING ESSENTIALLY OF A CARBON MATRIX CONTAINING A DISPERSION OF SIC- OR SI$_3$N$_4$-LINED VOIDS

[75] Inventor: Thomas P. O'Holleran, Chelsea, Mich.

[73] Assignee: KMS Fusion, Inc., Ann Arbor, Mich.

[21] Appl. No.: 889,700

[22] Filed: Jul. 28, 1986

[51] Int. Cl.$^4$ .................. C04B 38/00; C04B 35/54; C04B 35/56; C04B 35/58

[52] U.S. Cl. .................. 501/80; 501/90; 501/97; 501/99; 428/313.9; 428/315.5; 428/404; 428/406; 523/325; 523/218; 264/60; 264/DIG. 6; 264/29.1; 264/29.3

[58] Field of Search .............. 501/80, 90, 97, 99; 428/313.9, 315.5, 404, 406; 523/325; 264/60, DIG. 6, 29.1, 29.3

[56] References Cited

U.S. PATENT DOCUMENTS

| | | | |
|---|---|---|---|
| H200 | 1/1987 | Chen | 428/404 |
| 3,256,105 | 6/1966 | Alford | 501/80 |
| 3,810,963 | 5/1974 | Benton et al. | 264/DIG. 6 |
| 3,832,426 | 8/1974 | Malthouse et al. | 501/80 |
| 3,969,124 | 7/1976 | Stewart | 501/99 |
| 4,077,921 | 3/1978 | Sharpe et al. | 523/219 |
| 4,481,179 | 11/1984 | Wei | 501/90 |
| 4,619,905 | 10/1986 | Natausohn et al. | 501/97 |

Primary Examiner—Steven Capella
Assistant Examiner—David M. Brunsman
Attorney, Agent, or Firm—Barnes, Kisselle, Raisch, Choate, Whittemore & Hulbert

[57] ABSTRACT

A process for fabrication of refractory insulating materials wherein essentially pure silica shells are mixed with a polymeric graphite precursor dissolved in a solvent. The resulting slurry is placed in a forming mold, and the solvent is evaporated to form a polymeric matrix containing the shells as a dispersion. This matrix is pyrolized under an inert or reducing atmosphere to decompose the polymer and form a first product consisting essentially of a carbon matrix containing a dispersion of silica shells. To enhance refractory characteristics, such first product is fired at high temperature in an inert or reducing atmosphere to form a second product consisting of a carbon matrix containing a dispersion of SiC-lined voids, or in a nitrogen atmosphere to form a third product consisting of the carbon matrix containing a dispersion of Si$_3$N$_4$-lined voids.

19 Claims, 1 Drawing Sheet

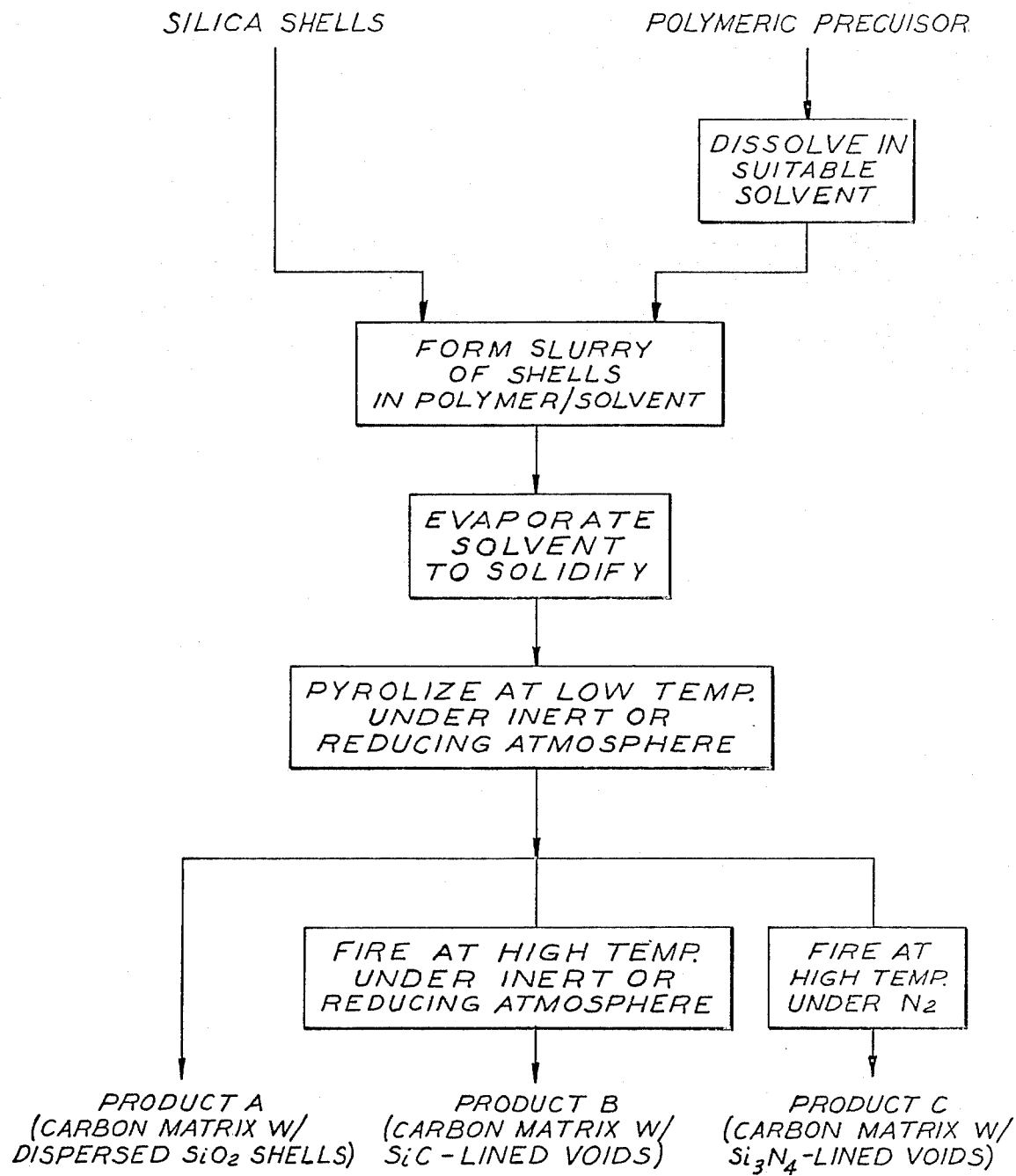

FABRICATION OF REFRACTORY INSULATING MATERIALS CONSISTING ESSENTIALLY OF A CARBON MATRIX CONTAINING A DISPERSION OF SIC- OR SI$_3$N$_4$-LINED VOIDS

The present invention is directed to fabrication of solid insulating materials, particularly high-temperature (refractory) insulating materials, and to the resulting product.

It is a general object of the present invention to provide a process for fabrication of insulating materials which is economical to implement, which is adapted to fabricate products in a variety of shapes and sizes, and which yields a product having good insulation, wear and corrosion properties.

It is a further object of the invention to provide a process of the described character which yields a refractory product suitable for high temperature applications.

Another object of the invention is to provide the products resulting from such process.

In accordance with the process of the present invention, starting materials are hollow spherical glass shells or microballoons, preferably of essentially pure silica composition, and a polymeric graphite precursor. The polymeric precursor is dissolved in a suitable solvent, and the shells are then mixed in the polymer/solvent solution to form a slurry. The slurry is placed into a suitable mold or other forming structure, and the solvent is evaporated to leave a solid polymeric matrix containing a dispersion of silica shells. The matrix and dispersion are pyrolized at low temperature under an inert or reducing atmosphere to decompose the polymer and form a first product comprising, and preferably consisting essentially of, a carbon matrix containing a dispersion of silica shells. This product possesses good insulating properties, and is itself suitable for high-temperature applications.

To obtain enhanced refractory characteristics suitable for high-temperature applications, the shell/matrix product is fired at high temperature in an inert atmosphere to react the silica material of the shells with a portion of the matrix and form a second product consisting of a carbon matrix containing a dispersion of SiC-lined voids. By adjusting the shell/matrix ratio, bodies from pure SiC with controlled microstructural porosity to various SiC/carbon composites possessing high refractory characteristics can be formed. A modification contemplates firing of the first shell/matrix product at high temperature under nitrogen to form a third product consisting of a carbon matrix having a dispersion of Si$_3$N$_4$-lined voids.

The invention, together with additional objects, features and advantages thereof, will be best understood from the following description, the appended claims and the accompanying drawing which is a schematic diagram of a process and resulting product in accordance with a presently preferred implementation of the invention.

Referring to the drawing, starting materials in accordance with the process of the invention comprise, and preferably consist essentialy of, a polymeric precursor and hollow spherical shells or microballoons of silicate glass composition. Most preferably, the shell precursors are of essentially pure silica (SiO$_2$) composition, i.e. at least 90% pure silica. The glass shells preferably have an outside diameter in the range of 45-175 $\mu$m and a wall thickness in the range of 1-2 $\mu$m. Silica shells of the preferred composition and size range are commercially available from Emerson & Cuming of Canton, MA, or may be manufactured in accordance with the process disclosed in U.S. Pat. No. 4,336,338.

The polymeric precursor is a graphite precursor, preferably selected from the group consisting of poly (acrylonitrile), epoxies and coal tar pitch. The precursor is dissolved in a suitable solvent, such as dimethyl formaldehyde, dimethyl sulfoxide and hexane. A multiplicity of shells are then mixed with the polymer/solvent solution to form a slurry. In practice of the invention, the volumetric ratio of shells to precursor in the slurry is preferably in the range of 45-55%. The slurry is then poured, injected or otherwise placed into a mold or other suitable forming structure, and the solvent is evaporated to form a solid polymeric matrix containing a dispersion of shells. Such evaporation may be carried out at room temperature, or may be enhanced by subjecting the slurry to an elevated temperature in the range of 100°-145° C.

The solid polymer matrix with dispersed shells is then pyrolized at relatively low temperature in an inert or reducing atmosphere to decompose the polymer and thereby form Product A which comprises, and preferably consists essentially of, a carbon (graphite) matrix 10 containing a dispersion of silica glass shells 12. Such pyrolysis is preferably carried out at a temperature in the range of 325°-375° C. Oxygen partial pressure is preferably in the range of 0.001-0.005 atm. Product A possesses good thermal insulation qualities, having a thermal conductivity at room temperature in the range of $1.78 \times 10^{-3}$ to $2.15 \times 10^{-3}$ Cal cm/sec cm$^{2\circ}$ C. depending upon the volumetric ratio of shells to matrix.

To obtain improved refractory characteristics, Product A is fired at elevated temperature, preferably in the range of 1550°-1600° C. Such firing operates to react the silica of the glass shells with carbon in the surrounding matrix. Where such firing is carried out in the absence of an air atmosphere, the resulting Product B comprises, and preferably consists essentially of, a carbon (graphite) matrix 10 containing a multiplicity of voids or pockets 14 lined with SiC. Such lining has a thickness which approximates the thickness of the initial shell walls. By adjusting the initial shell/precursor volumetric ratio, bodies from pure SiC with controlled microstructural porosity to various SiC/carbon composites having high refractory characteristics can be formed.

Where high-temperature firing of Product A is carried out in the presence of a nitrogen gas atmosphere, preferably at a nitrogen pressure in the range of 0.95 to 10.0 atm. and at a temperature in the range of 1650°-1700° C., nitrogen diffuses into the matrix and reacts with the silicon product of the shell/matrix reaction. The resulting Product C thus comprises, and preferably consists essentially of, a carbon (graphite) matrix 10 containing a dispersion of Si$_3$N$_4$-lined voids or pockets 16. Refractory Products B and C have thermal conductivities in the range of $2.59 \times 10^{-3}$ to $6.35 \times 10^{-3}$ cal cm/sec cm$^{2\circ}$ C., depending upon initial shell/precursor volumetric ratio, and can withstand temperatures up to 2600° C.(B) or 1800° C.(C) in non-oxidizing atmosphere.

The invention claimed is:

1. A process for fabrication of solid insulating materials comprising the steps of:

(a) dissolving a polymeric graphite precursor in a volatile solvent to form a polymer/solvent solution,
(b) mixing hollow spherical shells of essentially pure silica composition with said polymer/solvent solution to form a slurry,
(c) placing said slurry in a forming mold,
(d) evaporating said solvent to form a solid polymeric matrix containing a dispersion of said shells, and
(e) pyrolizing said matrix at a temperature in the range of 325°–375° C. under an inert or reducing atmosphere to decompose the polymer and form a first product consisting essentially of a carbon matrix containing a dispersion of silica shells.

2. The process set forth in claim 1 wherein oxygen partial pressure during said step (d) is in the range of 0.001–0.005 atm.

3. A process for fabrication of solid insulating materials comprising the steps of:
(a) dissolving a polymeric graphite precursor in a volatile solvent to form a polymer/solvent solution,
(b) mixing hollow spherical shells of essentially pure silica composition with said polymer/solvent solution to form a slurry,
(c) placing said slurry in a forming mold,
(d) evaporating said solvent to form a solid polymeric matrix containing a dispersion of said shells,
(e) pyrolizing said matrix under an inert or reducing atmosphere to decompose the polymer and form a first product consisting essentially of a carbon matrix containing a dispersion of silica shells, and
(f) firing said first product in an inert or reducing atmosphere to react the silica materials of said shells with a portion of the matrix and thereby form a second product consisting essentially of a solid carbon matrix containing a dispersion of SiC-lined voids.

4. The process set forth in claim 3 wherein said shells have diameters in the range of 45–175 μm.

5. The process set forth in claim 4 wherein said shells have a wall thickness in the range of 1–2 μm.

6. The process set forth in claim 3 wherein said polymeric precursor is selected from the group consisting of poly, epoxies and coal tar pitch.

7. The process set forth in claim 6 wherein said solvent is selected from the group consisting of dimethy formamide, dimethyl sulfoxide and hexane.

8. The process set forth in claim 3 wherein said step (f) is carried out at a temperature in the range of 1550°–1600° C.

9. The process set forth in claim 8 wherein said shells and said precursor have a volumetric ratio in the range of 45–55%.

10. A process for fabrication of solid insulating materials comprising the steps of:
(a) dissolving a polymeric graphite precursor in a volatile solvent to form a polymer/solvent solution,
(b) mixing hollow spherical shells of essentially pure silica composition with said polymer/solvent solution to form a slurry,
(c) placing said slurry in a forming mold,
(d) evaporating said solvent to form a solid polymeric matrix containing a dispersion of said shells,
(e) pyrolizing said matrix under an inert or reducing atmosphere to decompose the polymer and form a first product consisting essentially of a carbon matrix containing a dispersion of silica shells, and
(f) firing said first product under nitrogen to react the silica material of said shells with $N_2$ and a portion of the matrix and thereby form a product consisting essentially of a solid carbon matrix containing a dispersion of $Si_3N_4$-lined voids.

11. The process set forth in claim 10 wherein said shells have diameters in the range of 45–175 μm.

12. The process set forth in claim 11 wherein said shells have a wall thickness in the range of 1–2 μm.

13. The process set forth in claim 10 wherein said polymeric precursor is selected from the group consisting of poly (acrylonitrile), epoxies and coal tar pitch.

14. The process set forth in claim 13 wherein said solvent is selected from the group consisting of dimethyl formamide, dimethyl sulfoxide and hexane.

15. The process set forth in claim 10 wherein said step (f) is carried out at a temperature in the range of 1650°–1700° C.

16. The process set forth in claim 15 wherein said nitrogen is at a pressure in the range of 0.95–10.0 atm.

17. The process set forth in claim 16 wherein said shells and said precursor have a volumetric ratio in the range of 45–55%.

18. A solid refractory insulating material consisting essentially of a matrix of essentially pure carbon composition containing a dispersion of SiC-lined voids.

19. A solid refractory insulating material consisting essentially of a matrix of essentially pure carbon composition containing a dispersion of $Si_3N_4$-lined voids.

* * * * *

UNITED STATES PATENT AND TRADEMARK OFFICE
CERTIFICATE OF CORRECTION

PATENT NO.  : 4,769,348
DATED       : September 6, 1988
INVENTOR(S) : Thomas P. O'Holleran It is certified that error appears in the above-identified patent and that said Letters Patent are hereby corrected as shown below:

Col. 3, Line 48, after "poly" but before the comma (,) insert -- (acrylonitrile) --.

Col. 4, Line 50, change "$S_{i3}N_4$" to -- $Si_3N_4$ --.

Signed and Sealed this

Twenty-fourth Day of January, 1989

Attest:

DONALD J. QUIGG

Attesting Officer

Commissioner of Patents and Trademarks